Aug. 13, 1929.  C. STERN  1,724,434
LUBRICATING DEVICE
Filed Jan. 25, 1928   2 Sheets-Sheet 1

INVENTOR.
Charles Stern
BY Mawhinney & Mawhinney
ATTORNEYS

Aug. 13, 1929.  C. STERN  1,724,434
LUBRICATING DEVICE
Filed Jan. 25, 1928   2 Sheets-Sheet 2
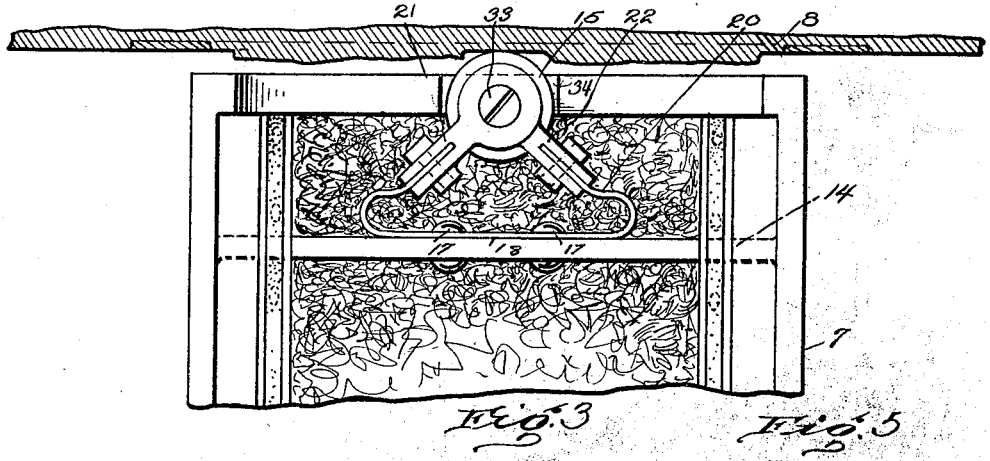
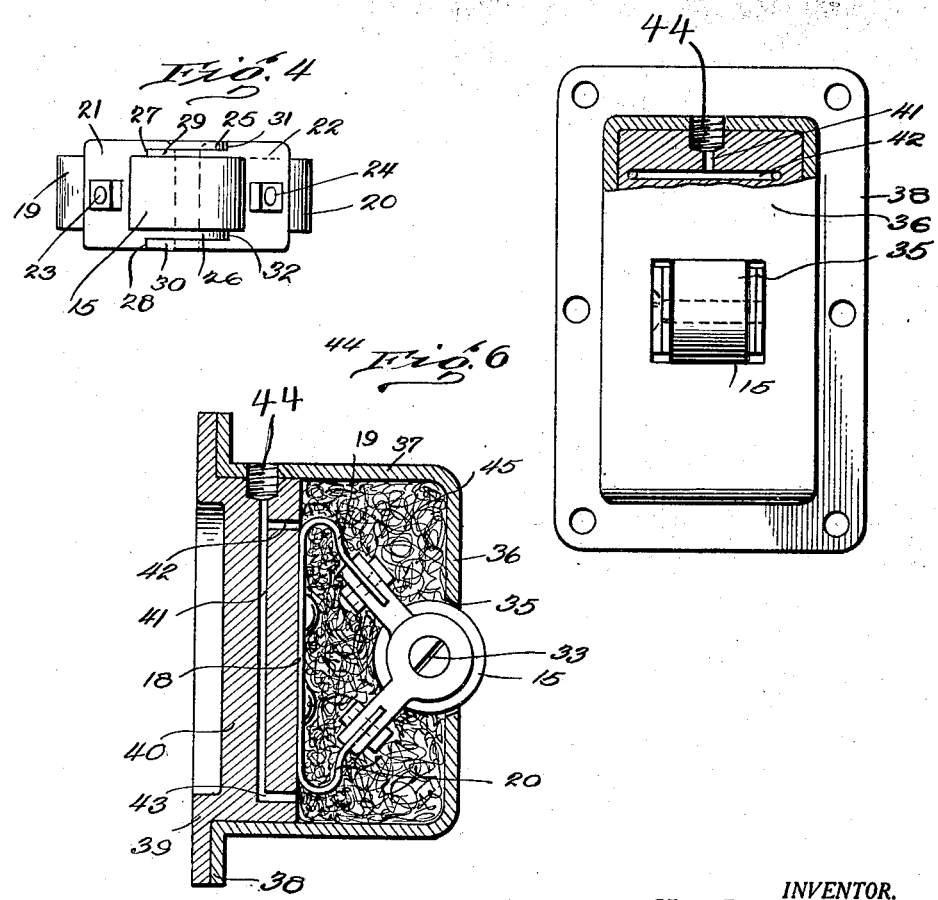
INVENTOR.
Charles Stern
BY Mawhinney & Mawhinney
ATTORNEYS Patented Aug. 13, 1929.

1,724,434

UNITED STATES PATENT OFFICE.

CHARLES STERN, OF JERSEY CITY, NEW JERSEY, ASSIGNOR, BY MESNE ASSIGNMENTS, TO ARDCO MANUFACTURING COMPANY, OF HOBOKEN, NEW JERSEY, A CORPORATION OF DELAWARE.

LUBRICATING DEVICE.

Application filed January 25, 1928. Serial No. 249,415.

The present invention relates to improvements in lubricating devices and refers more particularly to an improved device for oiling the hubs of engine truck wheels, and also the driving wheels of locomotives.

It is an object of the invention to provide a device which will constantly keep the hubs of the truck or driving wheels well lubricated, while the wheels are in motion to prevent the rapid wear of the hub liners. This wear occurs by the constant lateral motion against the hub, the hub rubbing against the liners and creating friction and wear between these parts. This wear is peculiarly accentuated in a locomotive by reason of what is known as the "lateral motion", resulting from the action of the driving mechanism, which tends to shift the boiler, and whole body of the locomotive, from one side to the other. The lateral motion is felt very strongly on curves and devolves largely upon the flanged wheels of the locomotive. The presence of this lateral motion in the locomotive has created the problem of taking care of the wear created by the hubs of the various locomotive wheels upon the journal boxes, and this problem has been heretofore solved to a minor extent only, by the application of what are known as hub liners. These hub liners wear out frequently and must be replaced at considerable labor and expense.

It is the purpose of the present invention to provide for the constant and faithful application of lubricant to the hubs in order to relieve, as much as possible, this wearing friction from the hub liners and to thereby impart to the liners, hubs and boxes a longer life with a corresponding decrease in operating expense. While the invention is applicable to cellars and journal boxes, it is also within the contemplation of the invention to construct a separate lubricating box or device that may be applicable to the hubs of the driving wheels or to the hubs of other vehicle wheels, or to the moving parts of machinery generally.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal section taken through an engine truck cellar, the journal being omitted.

Figure 3 is a fragmentary top plan view with a portion of the wheel hub shown in section.

Figure 4 is an end elevation of the lubricating roller.

Figure 5 is an end elevation of a lubricating device constructed independently of the truck cellar, and Figure 6 is a longitudinal central section through the same.

Referring more particularly to that form of the invention, shown in Figures 1 to 4 inclusive, 7 designates generally an engine truck cellar for receiving the journal (not shown); and 8 represents a portion of the hub of one of the engine truck wheels.

Figure 1:
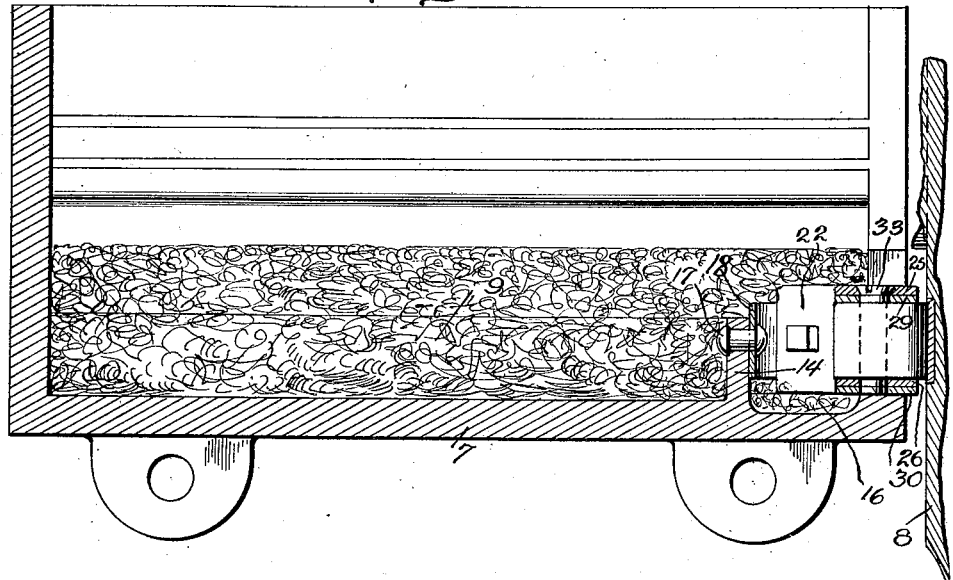
Figure 2:
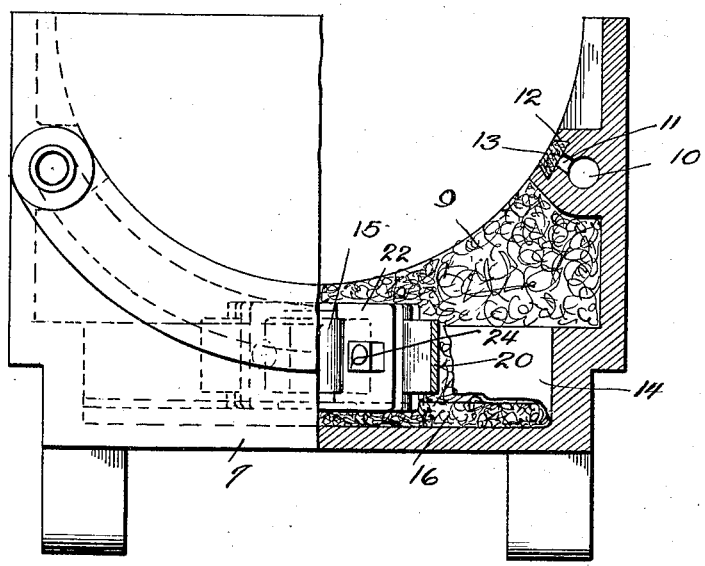
Figure 2 is an end view of the truck cellar, partly shown in section.

The waste is indicated at 9 and fits in semi-circular formation about the lower portion of the journal, as indicated in Figure 2. The particular cellar shown is made conformably to the co-pending application of Charles Stern, and James J. Carlock, entitled Railway journal oiling device, filed September 8, 1927, Serial No. 218,299.

According to that application longitudinal oil channels 10 are provided in the cellar having numerous ports 11 leading therefrom for conveying an oil or lubricant to grooves 12, preferably dove-tail in cross section, which contain the felt or other pads or strips 13. The oil passing through the perforations seeps slowly through the wicks or felt pads 13 onto the waste, thereby keeping the waste constantly saturated with oil and keeping journal at all times well lubricated. The lubricant is supplied to the channels 10 by gravity or otherwise and from a tank or other source of liquid lubricant supply.

In accordance with the present invention, the cellar is modified in construction only very slightly and inexpensively, while at the same time advantage is taken of the channel oiling arrangement.

I construct transversely across the cellar a partition 14 which extends up from the bottom of the cellar to an appropriate height to subserve two functions; first to provide a support for supporting the lubricating roller 15 which bears, by spring or other pressure, yieldably against the hub 8 of the wheel; and secondly to segregate the waste 9 from another batch 16 of waste, which is confined about the inner portion of the roller 15 by the partition 14 and kept thereby from receding away from the roller 15.

A rivet or other fastening is shown at 17 as passing through the partition 14 and also through the intermediate portion 18 of a spring member having the two convergent arms 19 and 20. These arms converge away from the partition 14 and they are both designed to enter in the sockets carried by the bifurcated heads 21 and 22 of the roller supports. The roller arm 21 is provided with the rings 25 and 26, as shown in Figure 4, and with the shoulders 27 and 28. The companion head 22 is provided with the bearing rings 29 and 30 and with the shoulders 31 and 32. The rings 25 and 29 at one side of the roller 15 overlap one another and receive mutual bearing at the shoulders 27 and 31. At the opposite side of the roller, the bearing rings 26 and 30 overlap and turn one upon the other, securing accurate registry, proper fit and maintenance in faithful alinement by the mutual engagement of the shoulders 28 and 32.

Fastenings 23 and 24 are shown as passing through the bifurcated portions of the heads 21 and 22 for securing the spring arms 19 and 20 in place. The various bearing rings referred to are perforated in registry with an axial perforation in the roller 15 and a screw or other bearing pin 33 is passed through the alining openings and secured as by screw threading into one or more of the bearing rings.

The cellar is further modified by the provision of the slot 34 in the wall thereof next the wheel to permit the lubricating roller 15 to project therethrough and to have a slight lateral motion therein.

In the use of the device, the lubricant supplied to the channels 10 will not only drip upon the waste 9 in the main compartment of the truck cellar, but it will also be conveyed to the batch of waste 16 in the inner compartment cut off by the partition 14. As the inner portion of the roller 15 constantly wipes against this waste 16, the peripheral surface of the roller 15 will be at all times kept moist and coated with a film of the oil or grease. The latter will be in turn applied to the locomotive hub, or to the hub liner, inasmuch as the wheel 15 is projected by the spring action constantly against the locomotive hub, and is in turn rotated by the turning movement of the hub, so that fresh peripheral surfaces on the roller 15 are progressively presented to the hub and to the waste 16. As the lateral motion occurs, the hub 8 may approach to, and recede from, the cellar 7, and in doing so, it may freely push the yieldably supported roller 15 in and out. The spring will at all times keep the roller against the hub. In the movement of the roller 15, the roller heads 21 and 22 rotate relatively to one another permitting the bifurcated portions engaging the spring arms to spread and contract and to shift the spring arms accordingly. The tendency of these spring arms to regain their normal shape will keep the lubricating roller in contact with the hub.

Referring now to the modified form of the invention shown in Figures 5 and 6, this form is applicable to the locomotive driving wheels or to other commercial machines. The roller, its support and spring, are the same in construction and have been given the same reference symbols. In this instance the roller 15 projects through a slot 35 made in the front wall 36 of the box having the side walls 37 of substantially rectangular or other construction and provided with the perforated out-turned flange 38.

Against this flange is received a similar flange 39 formed upon a cover head 40 which carries the spring 18. In the head is made a channel 41 having eduction ports 42 and 43 for conveying lubricant to the waste 45 within the container. Bolts or other fastenings are passed through the registering perforations in the flanges 38 and 39 for the purpose of affixing the device to the frame of the machinery at the location desired. The action of the device is the same as in the preceding form. A threaded socket 44 is provided in the box and cover to receive a threaded nozzle or other connection of a hose from the oil cup.

It is obvious that various changes and modifications may be made in the details of construction and design of the above specifically described embodiment of this invention without departing from the spirit thereof, such changes and modifications being restricted only by the scope of the following claims.

What is claimed is:—

1. A lubricating device comprising a container having a slotted wall located adjoining a rotary part to be lubricated, a member having spring arms affixed in the container, scissor-like heads secured to the spring arms, a roller journaled in the heads and adapted to project through the slot against the rotated part, and a lubricant absorbent material in the casing bearing against said roller.

2. An improved lubricating device comprising a container having a slotted portion located adjacent a rotary hub to be lubricated, a member having spring arms affixed in said casing, complementary pivot heads having shank portions engaging the spring arms, a roller carried by said heads for yieldably projecting through the slot and engaging the rotary hub, a body of waste in the container bearing against the roller, and means for supplying lubricant to the waste.

3. An improved engine truck cellar having a substantially vertical end wall adjacent to a hub to be lubricated and provided with an opening in such end wall, a yieldably mounted applicator extending loosely through said opening and against the hub to be lubricated and having a moving lubricating surface adapted to contact with the hub to be lubricated and to move through the opening in said cellar wall and into the space within the cellar, means within the cellar for yieldably mounting said applicator, a body of waste within the cellar and against the moving surface of the applicator, and means in the cellar for keeping said waste moist with lubricant.

4. An improved engine truck cellar having a substantially vertical wall adjacent a hub to be lubricated and having an opening through said wall opposite the hub, a body of waste within said cellar, means for maintaining said waste moist with lubricant, a partition in said cellar lower than the body of waste and adjacent but spaced from said wall, an applicator having a surface alternately moving against the waste and the hub, and means carried by said partition for flexibly supporting said applicator.

In testimony whereof I affix my signature.

CHARLES STERN.